US006800155B2

(12) United States Patent
Senecal et al.

(10) Patent No.: US 6,800,155 B2
(45) Date of Patent: Oct. 5, 2004

(54) CONDUCTIVE (ELECTRICAL, IONIC AND PHOTOELECTRIC) MEMBRANE ARTICLERS, AND METHOD FOR PRODUCING SAME

(75) Inventors: Kris Senecal, N. Smithfield, RI (US); Lynne Samuelson, Marlborough, MA (US); Michael Sennett, Sudbury, MA (US); Heidi Schreuder-Gibson, Holliston, MA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 242 days.

(21) Appl. No.: 09/793,797

(22) Filed: Feb. 22, 2001

(65) Prior Publication Data

US 2001/0045547 A1 Nov. 29, 2001

Related U.S. Application Data

(60) Provisional application No. 60/184,677, filed on Feb. 24, 2000.

(51) Int. Cl.[7] .......... B29C 47/00

(52) U.S. Cl. .......... 156/62.4; 156/167; 156/181

(58) Field of Search .......... 156/167, 180, 156/181, 62.4

(56) References Cited

U.S. PATENT DOCUMENTS 5,096,586 A 3/1992 Kaner et al. .......... 210/500.37
5,262,195 A 11/1993 Moss et al. .......... 427/101
5,290,483 A 3/1994 Kulkarni et al. .......... 252/500
5,358,556 A 10/1994 Kaner et al. .......... 95/45
5,624,605 A 4/1997 Cao et al. .......... 252/500
5,882,566 A * 3/1999 Hsu et al. .......... 264/210.6
5,911,930 A 6/1999 Kinlen et al. .......... 264/104
5,993,694 A 11/1999 Ito et al. .......... 252/500
5,997,773 A * 12/1999 Angelopoulos et al. .......... 252/511
6,010,645 A 1/2000 Angelopoulos et al. .......... 252/500
6,030,550 A 2/2000 Angelopoulos et al. .......... 252/500
6,066,269 A 5/2000 Wei et al. .......... 252/500
6,265,333 B1 * 7/2001 Dzenis et al. .......... 442/346
6,555,945 B1 * 4/2003 Baughman et al. .......... 310/300

FOREIGN PATENT DOCUMENTS

DE 4402857 A1 * 8/1995 .......... D04H/1/70

* cited by examiner

*Primary Examiner*—Sam Chuan Yao
(74) *Attorney, Agent, or Firm*—Vincent J. Ranucci

(57) ABSTRACT

A conductive (electrical, ionic, and photoelectric) polymer membrane article, comprising a non-woven membrane of polymer fibers, wherein at least some of the fibers have diameters of less than one micron; and wherein the membrane has an electrical conductivity of at least about $10^{-6}$ S/cm. Also disclosed is the method of making such an article, comprising electrostatically spinning a spin dope comprising a polymer carrier and/or a conductive polymer or conductive nanoparticles, to provide inherent conductivity in the article.

8 Claims, 3 Drawing Sheets

CONDUCTIVE (ELECTRICAL, IONIC AND PHOTOELECTRIC) MEMBRANE ARTICLERS, AND METHOD FOR PRODUCING SAME

CROSS REFERENCE TO RELATED APPLICATION

This application claims priority of Provisional application Ser. No. 60/184,677, filed on Feb. 24, 2000.

GOVERNMENT RIGHTS

The invention disclosed herein may be manufactured, used, and licensed by or for the U.S. government for governmental purposes without the payment to us of any royalty thereon.

FIELD OF THE INVENTION

This invention relates to conductive and photonic polymer membrane articles, and methods to fabricate such articles.

BACKGROUND OF THE INVENTION

A number of studies have shown that conducting polymers processed into films and coatings can be used in a wide variety of applications. These applications include corrosion protection, static dissipation from polymer fibers, textile/fiber reinforcement to provide microwave-absorbing materials with stable radioelectric properties, radar absorbing composites and photovoltaic materials. The principal barrier to the commercial use of conductive polymers in these types of applications and others has been the lack of a viable and economically feasible processing technique that can fabricate these polymers into mechanically tough, stable and high surface area architectures.

Conducting polymer films are typically produced by casting or deposition from solution. Films produced in these manners are fragile, have a relatively low surface area, and are not porous.

Conductive polymers are also spin deposited into coagulating solutions to form conductive fibers. This process produces relatively gross fibers having diameters of around 10–100 um. These fibers are also weak, and have relatively low surface area.

SUMMARY OF THE INVENTION

It is therefore a primary object of this invention to provide conductive (electrical, ionic, and photoelectric) membrane articles that are lightweight and porous, yet have high surface area and are mechanically tough. Such articles can also be fabricated on flexible substrates, such as textiles.

It is a further object of this invention to provide conductive membrane articles that can be designed to have a wide range of electrical, ionic and photoelectric conducting properties.

This invention results from the realization that thin nanoporous conductive flexible articles having extremely high surface area, porosity and toughness can be fabricated by electrospinning at room temperature or thereabout a solution comprising of a matrix polymer and/or a conductor (such as a conducting polymer or conductive nanoparticles), to create a conductive (electrical, ionic, and photoelectric) membrane composed of a non-woven mat of fibers having diameters of less than one micron, corresponding to surface areas greater than 10 $m^2/g$.

The invention describes new electrospun conducting polymer membranes and composites that have high surface areas and are lightweight, tunable and active (electrically, chemically and optically). A purpose of this invention is to develop a new technique to process conducting polymers into useful and more efficient architectures for applications including but not limited to, ionic and electrical conductivity, photovoltaic devices, electrostatic dissipation, chemical sensing, corrosion protection, electromagnetic interference shielding and radar attenuation. Another purpose of this invention is to improve the electrospinning process in general, as addition of just a small amount of soluble conducting polymer to the polymer solutions used for spinning (known in the art as "spin dopes") improves fiber formation and morphology without imparting undesired effects to the final membrane. In this invention, conducting polymers (from organic or aqueous solution or as solid dispersions) are added directly into a spin dope mixture and applied to various surfaces, including but not limited to metals, semiconductors, glass and textiles, or processed as stand alone membranes, using electro spinning technologies.

The conducting polymer membranes of the invention have high surface areas and are lightweight, porous and permeable to vapor. These features are unique in the design and production of conductive thin films: the high surface area of the electrospun fiber enhances exposure of photo conductive compounds to important electrochemical reactions within the film; porosity enables the film to be infiltrated by getting liquids such as polyelectrolytes to improve performance and conductivity; increased interfaces allow for more efficient energy conversion; and vapor permeation enables the film constituents to be altered chemically by vapor reactions. These membranes have intrinsic electrical conductivities ranging from (but not limited to) 0.15 to $10^{-6}$ S/cm depending on the level and concentration of the conducting polymer(s) used in the spin dope, other components added to the spin dope and the architecture of the membranes. Many different polymers and materials can be blended to form unique membranes with improved properties for use in an array of applications. For example, improved properties including but not limited to mechanical toughness, adhesion, conductivity (electrical, ionic and photoelectric), recognition for sensing, and electromagnetic shielding may be built into these membranes through judicious choice of components.

Recent test results have led to the development of electrospinning techniques for the processing of soluble conducting polymers (organic solvent and aqueous based and mixtures thereof) and dispersions into new conducting polymer fibrous membranes and composite structures. The membranes and composites formed with this invention are unique and desirable in that they are nanoporous structures that have extremely high surface area, porosity and tunability (i.e. properties that can be varied over a range of values). These enhancements to date have not been available for the processing of conductive polymers and are extremely valuable for each of the above-mentioned applications. In addition, these electro spun conducting polymer membranes are inexpensive as they can be easily prepared and modified to the desired size and substrate.

These fibrous membranes can be processed at ambient conditions adhering to and forming vapor permeable membranes on a variety of substrates such as clothing or other surfaces, as well as forming stand-alone membranes. The conducting materials can be readily incorporated into fibrous networks with high surface areas without problematic techniques involving solubility and polymer casting of traditional membranes using conducting polymers. These membranes are lightweight and can be tailored for specific properties depending on use. Single or combinations of various conducting polymers can be added to the spin dope thereby adding their novel properties to the membrane. The conducting polymers also have an effect on the electrospinning process itself by acting in the spin dope to optimize fiber formation.

There are numerous embodiments of the invention, as the membranes can be formulated with not only conducting polymers but with a wide variety of other interesting electronic materials. When solubility is an issue, insoluble conductive particulate compounds and inorganic semiconductor nanoparticles can also be captured by the electrospinning techniques described to impart the desired properties of the included material and yet maintain the similar properties of the nanofibrous membrane as described in this disclosure.

This invention can be used for the fabrication of novel conducting materials for electrostatic dissipation, corrosion protection, electromagnetic interference shielding, signature reduction, photovoltaic devices, lightweight batteries, conductive fabrics and chemical and biological sensing. Other potential applications of this invention include the use of a small amount of conducting polymer in the spin dope to improve electrospinning and fiber formation of other desirable polymeric materials.

BRIEF DESCRIPTION OF THE DRAWINGS

Other objects, features and advantages will occur to those skilled in the art from the following description of the preferred embodiments, and the accompanying drawings, in which.

DETAILED DESCRIPTION OF THE PREFERRED EMBODIMENTS

Figure 1:
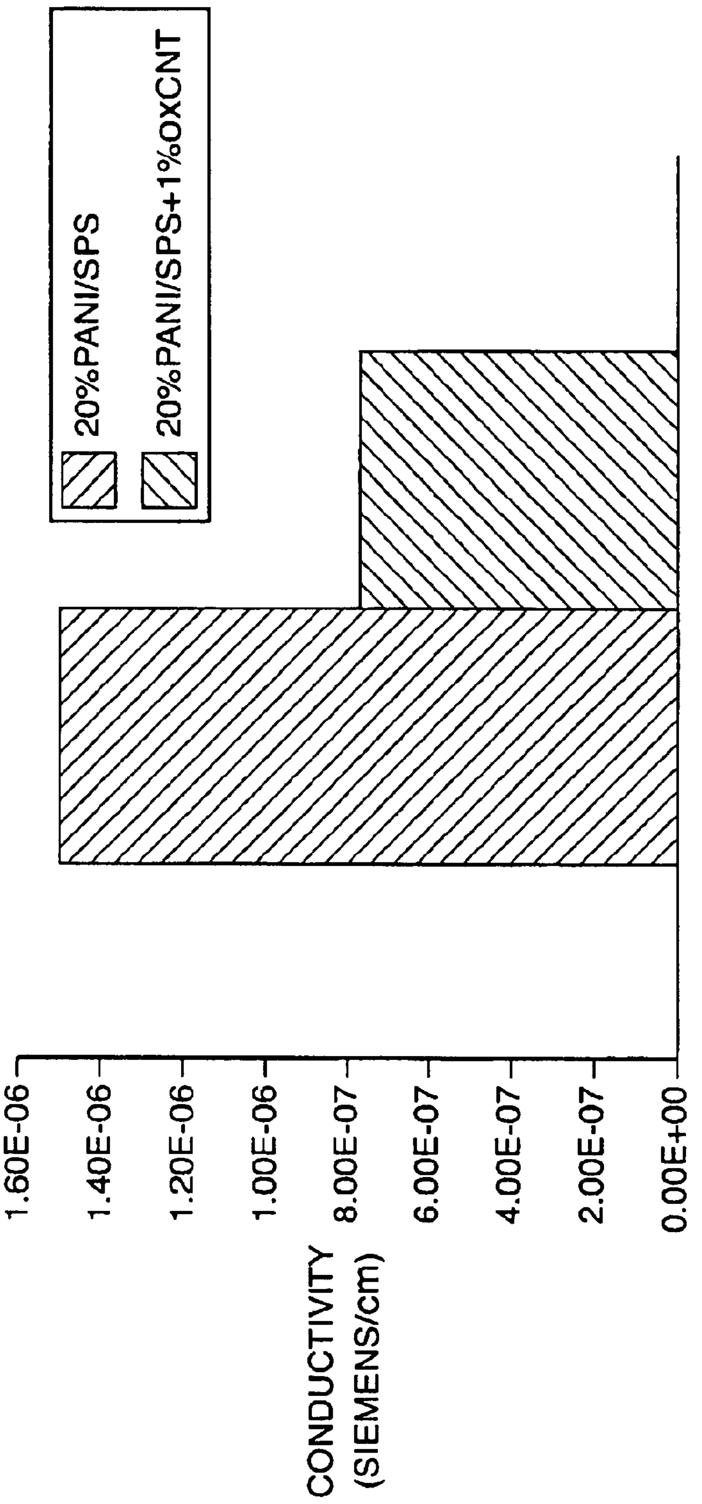
FIG. 1 shows the effect of Polyaninile/SPS (PANI/SPS) content, and the addition of oxidized carbon nanotubes (oxCNT) on the DC conductivity of electrospun fiber mats in accordance with the invention.

The invention can be produced using a wide range of organic and aqueous soluble conducting polymers and dispersions thereof and inorganic conducting nanoparticles contained in a polymeric matrix material which are then electrospun together to form a non-woven fibrous mat or membrane. Non-limiting examples of conducting polymers include polyaniline, polypyrrole, polythiophene, polyphenol, polyacetylene, and polyphenylene. Non-limiting examples of inorganic semi-conductor nanoparticles include but are not limited to, titanium dioxide, zinc oxide, tin sulfide and tin oxide. Non-limiting examples of matrix polymeric materials include but are not limited to polyurethane (PU), polyethylene oxide (PEO), polyacrylonitrile (PAN), polylactic acid (PLA), polyvinyl acetate (PVA), and cellulose acetate, contained in a matrix of additional polymeric material which are then electrospun together to form a fibrous mat or membrane.

A preferred embodiment of the invention is to incorporate a water-soluble complex of polyaniline and sulfonated polystyrene (PANI/SPS) into a DMF (dimethyl formamide) solution of polyurethane and to electrostatically spin fibers from the solution onto a target substrate. The PANI/SPS complex is added to the polyurethane solution at a level of 10–60% percent by weight. The resulting fibers are 0.1–1 microns in diameter. These PANI/SPS/PU membranes show reversible electrical doping/dedoping processes consistent with those observed with traditional bulk cast films of polyaniline. These conducting polymer membranes also show increased surface areas, mechanical toughness and porosity when compared to traditional bulk cast films of polyaniline.

A second preferred embodiment of the invention is to incorporate chemical indicator (pH) dyes into a DMF solution of polyurethane and to electrostatically spin fibers from solution onto a target substrate. Non-limiting examples of the colorimetric dyes include but are not limited to, phenol red, thymol blue and phenolphthalein. The indicator dye is added to the polyurethane solution at a level of 1–10% by weight. The resulting fibers are 0.1–1 microns in diameter, corresponding to a surface area of about 10–50 $m^2/g$. These indicator membranes incorporate the chemical dye within the nanofibers of the spun membrane and offer increased surface area, mechanical toughness and porosity. These indicator dye membranes demonstrate reversible color changes consistent with chemical environment exposures.

A third preferred embodiment of the invention is to incorporate photo-reactive compounds and semi conductive particles, both in the soluble and particulate forms, into a DMF solution of polyacrylonitrile and to electrostatically spin fibers from the solution onto a target substrate. In addition, layering or casting of these compounds may be used in combination with electrospun matrixes. Non-limiting examples of photo-reactive dyes include but are not limited to phthalocyanines, ruthenium complexes with organic ligands, porphyrins, and polythiophenes. The photo-reactive compounds (single or in combination) are added to the polymer solution at a level of 10–60% by weight. The resulting fibers from the electrospun form of the invention are 0.1–1 micron in diameter. These electrospun membranes show photoelectric conversion. The photo-reactive membranes show increased surface areas, flexibility, and porosity when compared to traditional solar cells.

This invention includes two classes of membrane articles comprising a non-woven mat of fibers having diameters of less than about one micron: electrically conductive articles having conductivities of at least about $10^{-6}$ S/cm, and photoelectric conducting capabilities that produce voltages of at least about millivolts/$cm^2$ and currents of at least about microamps/$cm^2$.

Electrospinning accomplishes smaller fibers (generally having diameters of about 20 nm to about 1 micron), that are more controlled in diameter as compared to melt spun fibers. Also, melt spinning operates at high temperatures that prevent the use of additives that would be destroyed or altered at such temperatures, while electrospinning operates at or around room temperature, thus accommodating a wider variety of additives, such as temperature sensitive and photo active biological dye compounds (e.g., bacteriorhodopsin).

The spun membranes comprise layers of non-woven fibers that directly incorporate the conductive polymer, the conductive nanoparticles, and/or the photoreactive compounds within the fibers themselves, so that the fibers have the conductive (electrical, ionic, and photoelectric) properties. The membranes thus formed are flexible, which allows them to be deposited on flexible substrates such as textiles, to accomplish an active textile material, or the membranes can stand alone.

The invention also provides for the incorporation of conductive nanoparticles such as particles of conductive or semiconductive materials, carbon nanotubes, or fullerenes and modified fullerenes. In the prior art, solar cell device processing using nanoparticles were sintered during manufacturing, requiring the use of high temperature materials only, and generally resulting in rigid devices. Conductivities of the membranes were measured thus:

Measurements were taken in the plane of the fibrous mat, with the charge carrier running parallel to the surface of the substrate. A van de Pauw measurement was made using four connections on the perimeter of the film; in this case it would be the corners of a rectangular section. It forces a current through two adjacent leads and measures the voltage across the other two.

The setup for photovoltaic current/voltage measurement is described as follows:

The current-voltage (I-V) characteristic of a solar cell was determined by a photovoltaic measurement system. An Oriel 1000-W Xenon lamp served as the standard light source, in combination with one ultraviolet long pass filter (cut-on wavelength 324 nm, Oriel 59458) and one heat-absorbing filter (Oriel 59060) to remove ultraviolet and infrared radiation. The Oriel Air Mass (AM) 0 filter (Oriel 81011) and AM 1.5 filter (Oriel 81075) were placed in the optical path to simulate AM 1.5 Direct solar irradiance. The light intensity was measured by an Oriel radiant power energy meter (70260) with a thermopile detector (70264). All experiments were performed at 1 sun of 100 mW/cm2 light intensity except special stated. A Keithley 2400 SourceMeter, which was controlled by a computer, was used to measure the I-V performance of the solar cell. The data was collected by a TestPointTM based program.

FIG. 1 illustrates the results of two experiments in accordance with the invention, wherein Polyaninile/SPS (PANI/SPS) 20% in a DMF solution was spun as described, with and without the addition of oxidized carbon nanotubes (oxCNT). The DC conductivity of the electrospun fiber mats was measured as described above, illustrating conductivities of at least about $10^{-6}$ S/cm.

Figure 2:
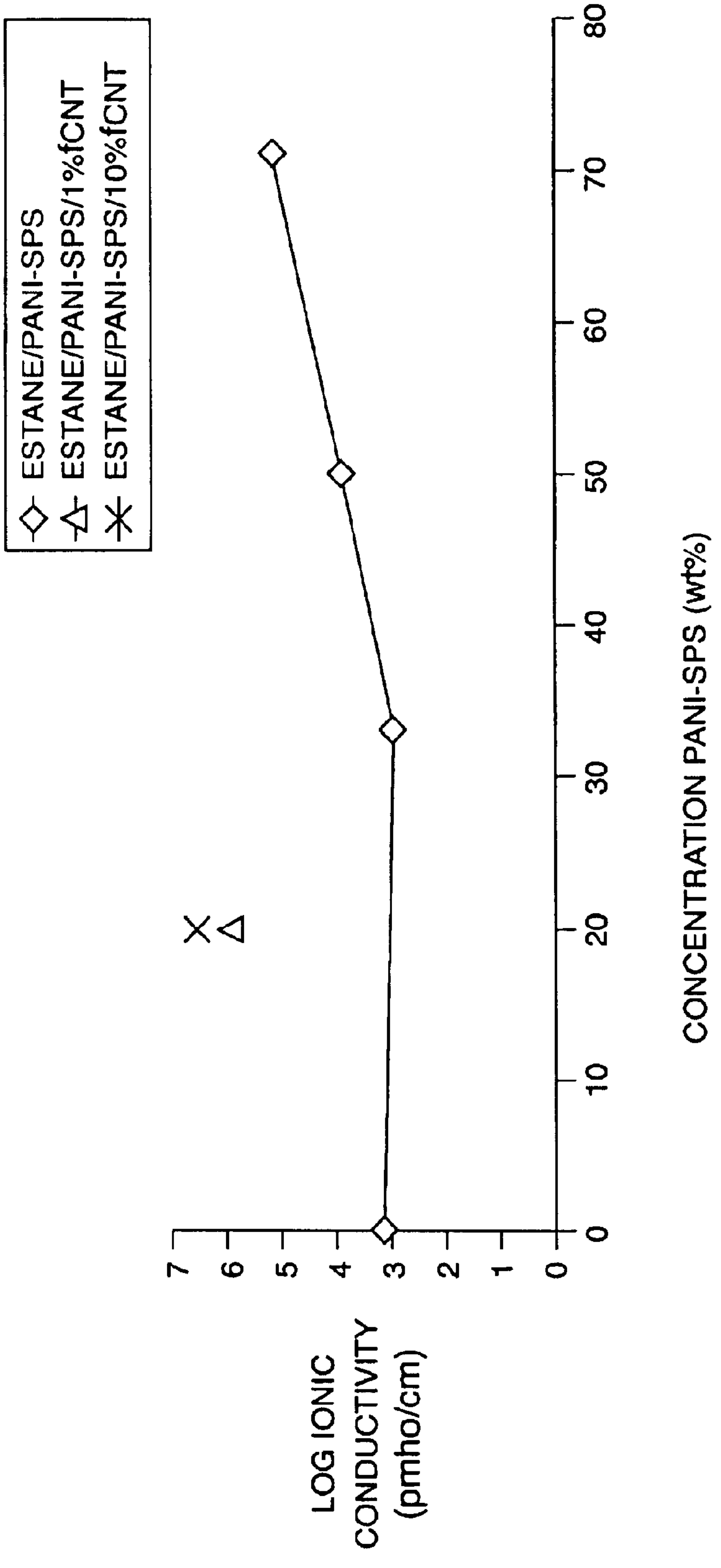
FIG. 2 shows the effect of PANI/SPS content, and the addition of furnace carbon nanotubes, on the AC conductivity of electrospun fibers of estane polyurethane in accordance with the invention.

FIG. 2 shows the effect of PANI/SPS content (weight percent), and the addition of furnace carbon nanotubes (fCNT), on the AC conductivity of electrospun fibers of estane polyurethane in accordance with the invention.

Figure 3:
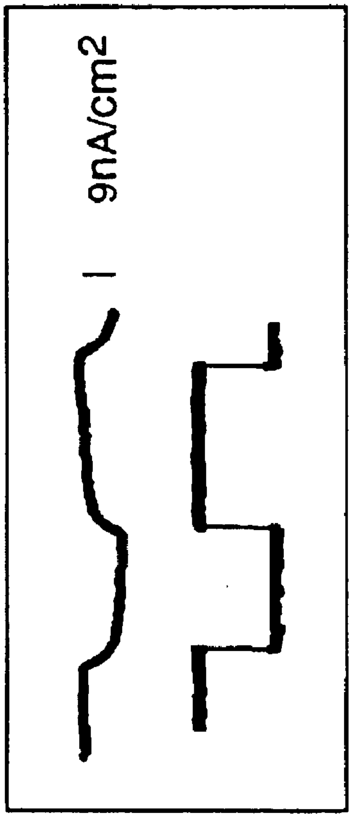
FIG. 3 illustrates the photovoltaic response from dilithium phthalocyanine with titanium dioxide particles electrospun onto indium tin oxide, in accordance with the invention.

FIG. 3 illustrates the photovoltaic response from dilithium phthalocyanine with titanium dioxide particles (diameters in the range of 20 to 150 nanometers) electrospun onto indium tin oxide, in accordance with the invention, illustrating the light intensity in the bottom curve and the photovoltaic response in the upper curve. The induced current density measured as described above was about 9 nanoamps per square centimeter.

Other embodiments will occur to those skilled in the art and are within the following claims.

What is claimed is:

1. A method of fabricating a conductive polymer membrane article, comprising:

providing a polymer solution;

adding to the polymer solution a conductive polymer and conducting nanoparticles to create a spin dope; and electrostatically spinning the spin dope to create a membrane of conductive polymer fibers having an electrical conductivity of at least about $10_{-6}$ S/cm; whereby said polymer solution being selected from the group consisting of polyurethane (PU), polyethylene oxide (PEO), polyacrylonitrile (PAN), polyactic acid (PLA), polyvinyl acetate (PVA), and cellulose acetate; and whereby said conductive polymer being selected from the group consisting of polyaniline, polypyrrole, polythiophene, polyphenol, polyacteylene, and polyohenylene.

2. The method of claim 1 wherein conducting nanoparticles are in the spin dope and embedded in the polymer fibers.

3. The method of claim 1 wherein a conductive polymer is the spin dope and in the polymer fibers.

4. The method of claim 1 wherein a photo-reactive dye is also added to the polymer solution before it is spun; said dye being selected from the group consisting of phthalocyanines, ruthenium complexes with organic ligands, porphyrins, and polythiophenes.

5. The method of claim 4 wherein conducting nanoparticles are in the spin dope and embedded in the polymer fibers.

6. The method of claim 4 wherein a conductive polymer is in the spin dope and in the polymer fibers.

7. The method of claim 4 wherein the membrane is exposed to photonic readiation, and becomes photoelectric.

8. The method of claim 7 wherein the membrane produces current of at least about nanoamps/$cm^2$.

* * * * *